US 10,805,654 B2

United States Patent
Mikan et al.

(10) Patent No.: US 10,805,654 B2
(45) Date of Patent: *Oct. 13, 2020

(54) SYSTEM AND METHOD FOR UPDATING USER AVAILABILITY FOR WIRELESS COMMUNICATION APPLICATIONS

(71) Applicant: AT&T Mobility II LLC, Atlanta, GA (US)

(72) Inventors: Jeffrey Mikan, Cumming, GA (US); Justin McNamara, Atlanta, GA (US); Fulvio Cenciarelli, Suwanee, GA (US); Anastasios Kefalas, Alpharetta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/203,771

(22) Filed: Nov. 29, 2018

(65) Prior Publication Data

US 2019/0110094 A1 Apr. 11, 2019

Related U.S. Application Data

(63) Continuation of application No. 14/824,344, filed on Aug. 12, 2015, now Pat. No. 10,148,986, which is a
(Continued)

(51) Int. Cl.
*H04N 21/258* (2011.01)
*G06F 17/00* (2019.01)
(Continued)

(52) U.S. Cl.
CPC .......... *H04N 21/258* (2013.01); *G06F 17/00* (2013.01); *H04H 60/45* (2013.01); *H04H 60/46* (2013.01);
(Continued)

(58) Field of Classification Search
CPC ......... H04W 24/00; H04W 4/00; H04W 4/02; H04W 4/023; H04W 4/206
(Continued)

(56) References Cited

U.S. PATENT DOCUMENTS

| 4,107,734 A | 8/1978 | Percy et al. |
| 4,107,735 A | 8/1978 | Frohbach |

(Continued)

OTHER PUBLICATIONS

U.S. Office Action dated Feb. 24, 2009 in U.S. Appl. No. 11/548,811.
(Continued)

*Primary Examiner* — Natasha W Cosme
(74) *Attorney, Agent, or Firm* — Hartman & Citrin LLC (57) ABSTRACT

Systems and methods for monitoring and updating user availability based upon presence and television viewing behavior are described herein. In one embodiment, a presence system is used to detect a user's presence to update the user's availability status. The availability status is then used to update a contact list, voicemail message, and/or busy message. In further embodiments, user preferences are used in combination with presence data to update the user's availability status. In still further embodiments, a user's television viewing behavior is used in combination with the presence data, user preferences, or both to update the user's availability status. Alternative embodiments provide systems and methods in accordance with the present invention for other interactive devices.

20 Claims, 5 Drawing Sheets

Related U.S. Application Data continuation of application No. 13/686,381, filed on Nov. 27, 2012, now Pat. No. 9,113,183, which is a continuation of application No. 11/548,811, filed on Oct. 12, 2006, now Pat. No. 8,374,590.

(51) Int. Cl.

| | | |
|---|---|---|
| *H04N 21/41* | (2011.01) | |
| *H04N 21/442* | (2011.01) | |
| *H04N 21/4788* | (2011.01) | |
| *H04N 21/81* | (2011.01) | |
| *H04L 12/58* | (2006.01) | |
| *H04L 29/08* | (2006.01) | |
| *H04H 60/45* | (2008.01) | |
| *H04H 60/46* | (2008.01) | |
| *H04H 60/52* | (2008.01) | |

(52) U.S. Cl.
CPC ............ *H04H 60/52* (2013.01); *H04L 51/043* (2013.01); *H04L 67/22* (2013.01); *H04L 67/24* (2013.01); *H04N 21/4126* (2013.01); *H04N 21/44218* (2013.01); *H04N 21/4788* (2013.01); *H04N 21/8173* (2013.01); *H04N 21/8186* (2013.01); *H04L 51/38* (2013.01)

(58) Field of Classification Search
USPC .......................................... 709/224; 725/9–14
See application file for complete search history.

(56) References Cited

U.S. PATENT DOCUMENTS

| | | | |
|---|---|---|---|
| 4,258,386 A | 3/1981 | Cheung | |
| 4,566,030 A | 1/1986 | Nickerson et al. | |
| 5,635,905 A | 6/1997 | Blackburn et al. | |
| 5,819,156 A | 10/1998 | Belmont | |
| 5,990,885 A | 11/1999 | Gopinath | |
| 6,011,578 A | 1/2000 | Shatto et al. | |
| 6,124,877 A | 9/2000 | Schmidt | |
| 6,317,881 B1 | 11/2001 | Shah-Nazaroff et al. | |
| 6,449,632 B1 | 9/2002 | David et al. | |
| 6,513,160 B2 | 1/2003 | Dureau | |
| 6,888,457 B2 | 5/2005 | Wilkinson et al. | |
| 7,035,923 B1 | 4/2006 | Yoakum et al. | |
| 7,039,928 B2 | 5/2006 | Kamada et al. | |
| 7,055,165 B2 | 5/2006 | Connelly | |
| 7,254,367 B2 | 8/2007 | Helden | |
| 7,356,137 B1 | 4/2008 | Burg et al. | |
| 7,359,496 B2 | 4/2008 | Qian et al. | |
| 7,483,964 B1* | 1/2009 | Jackson ............... | H04L 12/2809 455/41.1 |
| 7,631,042 B2* | 12/2009 | Chen .................... | G06Q 10/107 709/204 |
| 7,735,108 B2 | 6/2010 | FitzGerald | |
| 7,917,583 B2 | 3/2011 | Angiolillo | |
| 2002/0087973 A1 | 7/2002 | Hamilton et al. | |
| 2002/0123373 A1* | 9/2002 | Kirbas ............... | H04M 1/72572 455/567 |
| 2002/0198762 A1 | 12/2002 | Donato | |
| 2003/0142853 A1* | 7/2003 | Waehner ............ | G06K 9/00221 382/118 |
| 2004/0010797 A1 | 1/2004 | Vogel | |
| 2004/0082384 A1 | 4/2004 | Walker et al. | |
| 2005/0235318 A1 | 10/2005 | Grauch et al. | |
| 2006/0015609 A1 | 1/2006 | Hagale et al. | |
| 2006/0015891 A1 | 1/2006 | Lazzaro et al. | |
| 2006/0037038 A1 | 2/2006 | Buck | |
| 2006/0041902 A1 | 2/2006 | Zigmond | |
| 2006/0075421 A1 | 4/2006 | Roberts et al. | |
| 2006/0085812 A1 | 4/2006 | Shishegar et al. | |
| 2006/0123053 A1* | 6/2006 | Scannell, Jr. ....... | G06F 16/9577 |
| 2006/0218597 A1 | 9/2006 | FitzGerald | |
| 2006/0253593 A1 | 11/2006 | Jachner | |
| 2007/0156805 A1 | 7/2007 | Bristol et al. | |
| 2007/0198738 A1 | 8/2007 | Angiotillo et al. | |
| 2007/0265859 A1 | 11/2007 | Jachner | |
| 2012/0112877 A1 | 5/2012 | Gravino | |
| 2012/0270575 A1* | 10/2012 | Ferren ................ | G02B 13/0065 455/458 |

OTHER PUBLICATIONS

U.S. Office Action dated Sep. 3, 2009 in U.S. Appl. No. 11/548,811.
U.S. Office Action dated Aug. 3, 2010 in U.S. Appl. No. 11/548,811.
U.S. Office Action dated Jan. 21, 2011 in U.S. Appl. No. 11/548,811.
U.S. Office Action dated May 12, 2011 in U.S. Appl. No. 11/548,811.
U.S. Office Action dated Feb. 1, 2012 in U.S. Appl. No. 11/548,811.
U.S. Notice of Allowance dated Oct. 4, 2012 in U.S. Appl. No. 11/548,811.
U.S. Notice of Allowance dated Apr. 8, 2015 in U.S. Appl. No. 13/686,381.
U.S. Office Action dated Jul. 5, 2016 in U.S. Appl. No. 14/824,344.
U.S. Office Action dated Nov. 23, 2016 in U.S. Appl. No. 14/824,344.
U.S. Office Action dated Apr. 6, 2017 in U.S. Appl. No. 14/824,344.
U.S. Office Action dated Dec. 28, 2017 in U.S. Appl. No. 14/824,344.
U.S. Notice of Allowance dated May 2, 2018 in U.S. Appl. No. 14/824,344.

* cited by examiner

SYSTEM AND METHOD FOR UPDATING USER AVAILABILITY FOR WIRELESS COMMUNICATION APPLICATIONS

CROSS-REFERENCE TO RELATED APPLICATIONS

This patent application is a continuation of and claims priority to U.S. patent application Ser. No. 14/824,344, entitled "System and Method for Updating User Availability for Wireless Communication Applications," filed Aug. 12, 2015, now U.S. Pat. No. 10,148,986, which is incorporated herein by reference in its entirety; and which is a continuation of and claims priority to U.S. patent application Ser. No. 13/686,381, entitled "System and Method for Updating User Availability for Wireless Communication Applications," filed Nov. 27, 2012, now U.S. Pat. No. 9,113,183, which is incorporated herein by reference in its entirety; and which is a continuation of and claims priority to U.S. patent application Ser. No. 11/548,811, entitled "System and Method for Updating User Availability for Wireless Communication Applications," filed Oct. 12, 2006, now U.S. Pat. No. 8,374,590, which is incorporated herein by reference in its entirety.

TECHNICAL FIELD

The present invention relates generally to telecommunications systems and, more specifically, to updating user availability for wireless communication applications.

BACKGROUND OF THE INVENTION

Instant messaging clients are widely used and popular among Internet users. Instant messaging allows a user to maintain a contact list. Typically, this contact list is populated with friends, family, and/or co-workers. Instant messaging allows users to quickly and easily send a message to one or more of these individuals. Moreover, availability indicators are often used to notify users of the status of their contacts, such as available, unavailable, and busy. Other more detailed indicators also have been implemented.

Instant messaging services are now offered for wireless telephone subscribers. These services offer a mobile alternative with many of the same features that are available with traditional computer-based clients. In addition, mobile users can communicate with computer-based users directly. Mobile users also can communicate with computer-based users by forwarding instant messages from a user's computer to their mobile device or vice versa.

Wireless service subscribers have a variety of other wireless communication options such as push to talk (PTT), short message system (SMS) messaging, multimedia message system (MMS) messaging, voice messaging, and traditional voice calls. PTT, for example, provides a contact list similar to instant messaging with the ability to contact a user via half-duplex voice communication. The availability indicators for PTT are also similar to those of instant messaging. Traditional voice calls should continue to be the most prevalent wireless technology used; however, these supplemental services provide alternatives for situations in which a traditional telephone call is impractical.

Presence is another prevalent and fast growing technology field. Presence technologies have been implemented in a variety of applications. For example, security systems use a variety of sensors to detect the presence of potential thieves. By further example, Bluetooth-compatible mobile devices are capable of detecting a user's presence in their automobile and automatically transferring phone information including phonebook information and ongoing calls to their automobile's hands-free telephone system. Presence devices are also used in museums, art galleries, zoos, and other exhibitions to provide location-based information to patrons via a variety of means. Rudimentary presence determining features such as movement of a mouse or pressing a key on a keyboard are commonly used in computer systems to awake a computer from a standby or sleep mode.

Presence technology also has been used to determine a television viewer's like or dislike for a particular television show or movie by examining the behavioral and emotional responses of the viewer. Some television presence systems provide ratings information similar to Nielsen ratings, while others provide digital video recording functionality such as digital bookmarks for particular parts of a show or movie for which a television viewer behaviorally or emotionally indicates their preferences.

As briefly described above, the state of the art does not allow for updating the availability of one or more users for wireless communication applications based in part upon a user's presence relative to an interactive device. Thus, a heretofore unaddressed need exists for a system and method for providing user availability for a variety of wireless communication applications based upon a user's presence relative to an interactive device.

SUMMARY OF THE INVENTION

The present invention provides exemplary systems and methods for updating user availability for wireless communication applications based in part upon a user's presence. According to one embodiment of the present invention, a presence system includes means for determining presence in communication with at least one interactive device via any means for connection. The presence system further includes a signal input configured to receive a signal and transmit it to the interactive device. The presence system further includes a transceiver configured to allow communication between the interactive device and a communications network.

The presence system is capable of monitoring user presence via any means for determining presence. The presence system further is capable of determining an availability status for at least one mobile device user. The availability status can be sent from the presence system to at least one requesting mobile device via the transceiver.

In some embodiments, the availability status is based at least in part upon presence data acquired from the means for determining presence. In these embodiments, the availability status also may be based, at least in part, upon the viewing behavior of a user acquired through any means for determining presence.

A method for operating a presence system according to the present invention also is provided. In one embodiment, the method includes the steps of monitoring via any means for determining the presence of at least one mobile device user; sending presence data acquired during the monitoring step to at least one interactive device; generating an availability status for the mobile device user based at least in part upon the presence data; and sending the availability status to at least one mobile device that is in communication with a communications network.

In one embodiment, the method further includes the step of identifying a user based at least in part upon the presence data.

A mobile device also is provided. The mobile device includes a display, a speaker, a processor, a memory, and a wireless transceiver. The wireless transceiver is configured to receive an availability status generated by a remote presence system associated with a remote mobile device user.

In some embodiments, the availability status is used to update text on the display. In other embodiments, the availability status is used to update a voice message for the remote mobile device user, the voice message being played through the speaker. In still other embodiments, the availability status is used to update a busy message for the remote mobile device user, the busy message being played through the speaker.

DETAILED DESCRIPTION OF THE INVENTION

As required, detailed embodiments of the present invention are disclosed herein. It must be understood that the disclosed embodiments are merely exemplary of the invention that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present invention. Therefore, specific structural and functional details disclosed herein are not to be interpreted as limiting, but merely as a basis for the claims and as a representative basis for teaching one skilled in the art to variously employ the present invention.

Figure 1:
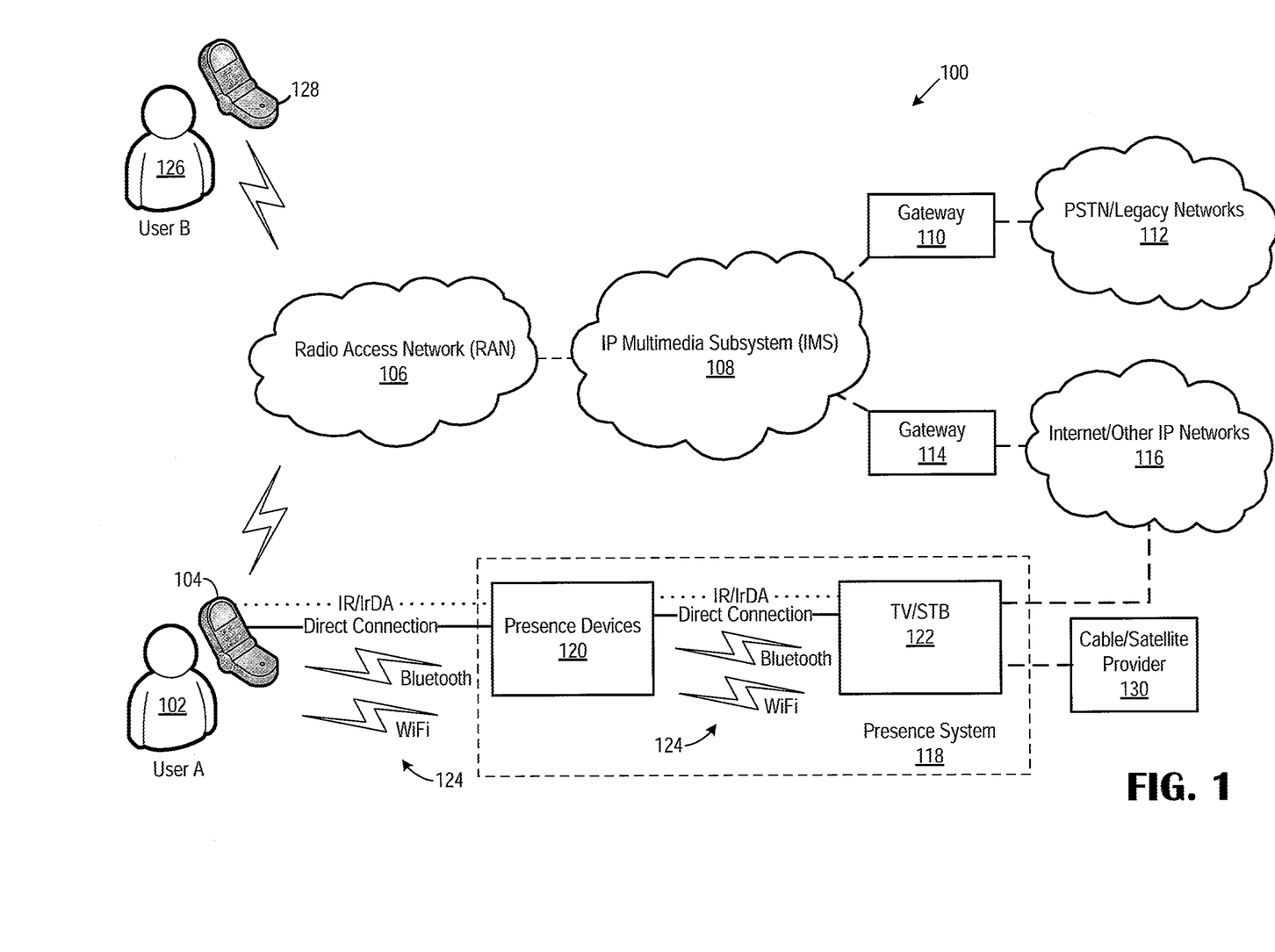
FIG. 1 illustrates a block diagram of a wireless communication system, according to an exemplary embodiment of the present invention.

Referring now to the drawings in which like numerals represent like elements throughout the several views, FIG. 1 depicts a wireless communication system 100, according to an exemplary embodiment of the present invention. The illustrated wireless communication system 100 includes a user (User A) 102 and associated mobile device (MD A) 104. MD A 104 is in communication with a radio access network (RAN) 106. The means for wireless communication used by the RAN 106 can include, but is not limited to, Time Division Multiple Access (TDMA), Code Division Multiple Access (COMA), Global System for Mobile communications (GSM), Wideband Code Division Multiple Access (WCDMA), Enhanced Data rates for Global Evolution (EDGE), General Packet Radio Service (GPRS), WiFi, Universal Mobile Telecommunication System (UMTS), IP Multimedia Subsystem (IMS) any combination thereof, and the like. Also in communication with the RAN 106 is MD B 128. MD B 128 is associated with User B 126.

A single RAN 106 is illustrated, however, it is contemplated that User A 102 and User B 126 can be in communication, via their respective MDs 104, 128, with RANs operating via different means for wireless communication. The illustrated RAN 106 is in communication with an IP Multimedia Subsystem (IMS) 108. It should be understood that a gateway (not shown) may be provided for non-IMS compatible devices. The gateway, for example, may include GPRS support nodes such as a Serving GPRS Support Node (SGSN) to allow access to IMS 108 via GPRS. Further, the MDs 104, 128 may be native IMS devices capable of attaching directly to the IMS 108 without an intermediate network, such as RAN 106. These devices would use IPv4 or IPv6 and run the appropriate Session Initiation Protocol (SIP) user agents, as is known to those skilled in the art.

The IMS 108 is also in communication with gateways 110 and 114. Gateways 110 and 114 provide access to a Public Switched Telephone Network (PSTN) 112 and the Internet or other IP network 116, respectively. Gateway 110 can be any gateway capable of providing access from a packet switched network (e.g., the IMS 108) to a circuit switched network (e.g., PSTN 112). In addition, gateway 110 can provide access to a Public Land Mobile Network (PLMN), which may comprise RAN 106. Gateway 114 can provide access to other IP networks, such as another IMS network.

The wireless communication system 100 also includes a presence system 118. The presence system 118 includes presence devices 120 that are in communication with a television/set-top box (TV/STB) 122. TV/STB 122 may be a single stand-alone unit or may comprise separate components in presence system 118. The TV/STB 122 is in communication with the Internet 116 and/or a cable/satellite provider 130. A television signal is acquired from one or both of these sources.

It should be understood that presence system 118 can further includes a number of devices in communication with the TV/STB 122. Additionally or alternatively, devices can be integrated into the TV/STB 122. These devices can be, for example, any type of audio and/or video devices known to those skilled in the art.

The presence devices 120 are used to detect presence, identify users, and monitor user viewing behavior. The presence data is used to update the availability status of a user for wireless communication applications, for example, PTT and IM. In addition, the presence data can be used to manipulate voicemail and busy messages for traditional voice calls.

The presence devices 120 can be any means for determining presence, for example, a facial recognition device, a voice recognition device, a fingerprint recognition device, a thermal imaging device, a motion sensor, a weight sensor, any combination thereof, and the like. The presence devices 120 are operatively linked to the TV/STB 122 via internal or external means for connection 124. The means for connection 124 can include, but is not limited to, infrared (IR), infrared data association (IrDA), Bluetooth, WiFi, direct connection (e.g., serial, USB, Ethernet, IEEE 1394 Firewire), any combination thereof, and the like.

Presence data acquired via presence devices 120 is transferred to TV/STB 122. An availability status is determined based upon a variety of factors such as, but not limited to, user preferences, user presence, user viewing behavior, and user emotional response. In one embodiment, the availability status is then sent to the access network on which a requesting MD is attached. The access network (e.g., RAN 106) can receive the availability status and update the requesting MD's contact list to reflect the new status. This method is described in more detail with respect to FIG. 3. In another embodiment, the availability status is sent to a voicemail server (not shown) in the user's access network (e.g., RAN 106). The voicemail server can receive the availability status and update a voicemail message and/or busy message to reflect the new status. This method is described in more detail with respect to FIG. 5.

The availability status can be sent through a wireless transceiver in communication with the access network or via a connection to an IP network 116. This connection can be facilitated by any means for provisioning internet service such as, but not limited to, Digital Subscriber Line (DSL), cable, satellite, and the like. Moreover, the local connection can be wired and utilize Ethernet protocol, or wireless and utilize IEEE 802.x wireless protocol(s).

Figure 2:
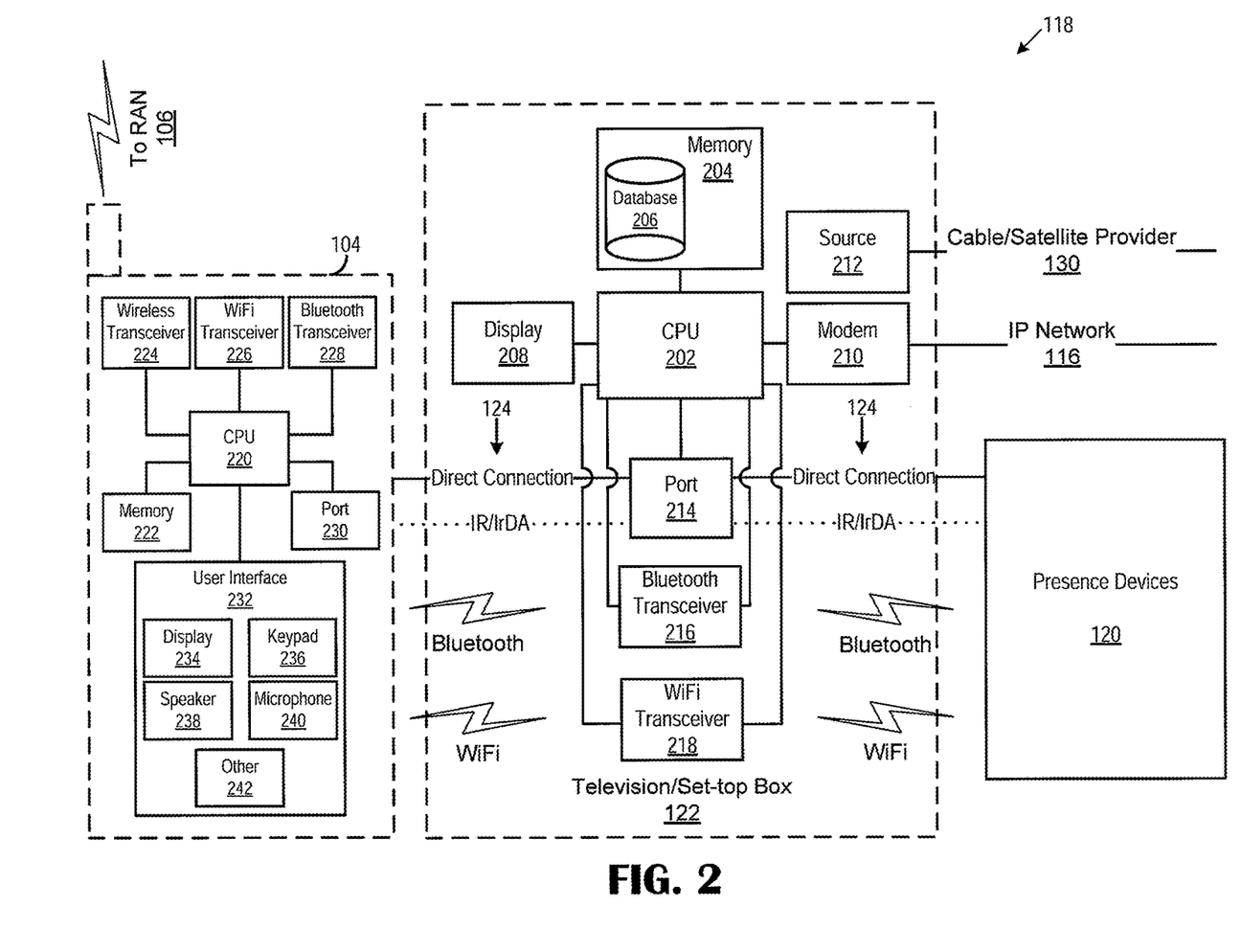
FIG. 2 illustrates a component view of a presence system, according to an exemplary embodiment of the present invention.

Means for determining presence are now described in greater detail. A facial recognition device as used herein is a device capable of detecting the presence of at least one person and in some applications the identity of the person or persons. The facial recognition device can be, for example, a video camera or a still camera. In some embodiments the camera is a low-resolution camera such as a web camera. The camera can be used to create a base image. The base image can then be stored in a local camera memory or sent to a memory 204 of TV/STB 122 (as shown in FIG. 2). The base image can be, for example, an image of the normal viewing span of the camera. Moreover, the base image can be stored in memory as any image format known to those skilled in the art. In use, subsequent image captures may show one or more persons in the image. A processor, for example, a camera processor or a Central Processing Unit (CPU) 202 (as shown in FIG. 2) can acknowledge the foreign additions, thus indicating the presence of a user. It should be understood that additional intelligence, for example, the ability to distinguish a household pet or a child from an adult user also can be implemented. The ability of the low resolution camera may be restricted to these features based on the physical limitations of such a device. Thus alternatively, a higher resolution still or video camera may be utilized.

A higher resolution still or video camera can not only detect the presence of a person, but also identify a particular person through distinguishable features. These features, commonly referred to in the art as nodal points are, for example, the distance between eyes, the width of the nose, the depth of the eye sockets, the cheekbones, the jaw line, and the chin. There are roughly eighty nodal points on a human face. The number of nodal points used in detecting one or more persons in the present invention may be any number that is appropriate for the number of users. For example, in single user homes the facial recognition device need only detect the presence of a single person. Likewise, the distinguishing features of that person are not required and as such a web camera may be the most practical solution for this application. In multi-user homes, however, a higher resolution camera is useful in accurately mapping the nodal points of a user's face, thus providing a base image to identify the user on subsequent occasions. Like the low-resolution camera embodiment, the present embodiment can detect the presence of a user via a similar method, after which the higher resolution camera can focus on the user's face for identification. A base image also may be acquired although in this embodiment (i.e., actual facial recognition), additional steps are necessary to accurately map the nodal points of a user's face. It is contemplated that setup and/or calibration procedures can be used to establish a user profile to which a base image of their face is associated. The user profile may contain other information and will be discussed as necessary herein. It should be understood that the facial recognition device may contain additional functionality and may be modified to adhere to certain implementation-specific restrictions.

After detecting the presence of a user and optionally the identity of the user, the facial recognition device can send the acquired image to the TV/STB 122 via any means for connection 124. The TV/STB 122 receives the image and compares it with the base image stored in memory (e.g., memory 204). As previously described, it is contemplated that the base image for a user can be associated with that user's profile. The user profile and base image can be stored in a database 206 (as shown in FIG. 2). It should be understood that the facial recognition software implemented and the algorithms used to compare images can be any known to those skilled in the art.

In addition to or as an alternative to, the facial recognition device, the presence system 118 may include a voice recognition device. The voice recognition device can be, for example, a wired or wireless microphone in communication with the TV/STB 122. The microphone may be capable of distinguishing sounds emitted from the TV/STB 122 and sounds from one or more users. This is useful in avoiding false indications of presence. As such the microphone may be configured to intercept or receive a duplicate of the audio signal received by the TV/STB 122 to aid in distinguishing these sounds. For example, the audio signal received directly from the source by the TV/STB 122 can be compared in real-time to the sounds received by the microphone to determine if one or more users are speaking.

Like the facial recognition device, the voice recognition device may be used to detect the presence of at least one person and in some applications the identity of the person or persons. The presence is detected by simple voice recognition. That is, a voice other than those produced by the TV/STB 122 is detected. This can be useful for single user systems in which a voice need not be identified. If a voice is detected, the presence system 118 can make a reasonable determination that a user is present.

In other embodiments the microphone may be accompanied by voice recognition software. This is particularly useful in applications with multiple users. The voice recognition software may contain setup and/or calibration procedures to create a voiceprint for a user. This, as is known to those skilled in the art, is often accomplished by a user reading one or more pre-determined phrases to create a voiceprint of the user. Other methods for creating a voiceprint are contemplated. The voiceprint can be associated with a user profile.

Yet another presence device that is contemplated is a fingerprint recognition device. The fingerprint recognition device can be, for example, an optical scanner or a capacitance scanner. Other fingerprint recognition types as known to those skilled in the art are also contemplated.

The fingerprint recognition device can be a stand-alone unit or can be integral to a MD or remote control. The fingerprint recognition device can be in communication with the TV/STB 122 via any means for connection 124. The fingerprint recognition device can be used to acquire a base scan. The base scan is an image of the ridges and valleys of a user's finger. Base scans can be stored in a fingerprint recognition device memory or can be stored in memory 204 (as shown in FIG. 2). The base scan is compared to subsequent fingerprint scans to identify a particular user. The fingerprint recognition device may be accompanied by fingerprint recognition software. The fingerprint recognition software may facilitate setup and/or calibration procedures similar to those previously described and may perform other functions known to those skilled in the art. The base scan can be associated with a user profile.

Still another presence device that may be included by presence system 118 is a thermal imaging device such as, but not limited to, an IR camera. The thermal imaging device is used to measure the body heat of a user. The average body temperature of a human is approximately 98.6 degrees Fahrenheit and as such it may be difficult to distinguish one person from the next using thermal imaging. Thus, the thermal imaging device can be used comparatively to the low-resolution camera described with reference to a facial recognition device. That is, a base heat signature can be acquired and stored in a memory of the thermal imaging device or in memory 204 (as shown in FIG. 2). The base heat signature may need to be replaced often due to fluctuations in the heat contained in, for example, furniture. Regardless of these restrictions, the presence of a thermally imaged user is likely to invoke a detection of presence by the presence system 118.

The thermal imaging device also is capable of identifying a particular user. This is accomplished using the height and/or shape of a user as shown in a user's heat signature. In this embodiment, a base heat signature also is acquired and appropriately stored. In this embodiment the base heat signature can be the profile of a user. That is, the size and shape of a user can be used to identify a user.

In either of the above embodiments that use a thermal imaging device, the base heat signature is compared to subsequent base heat signatures during detection of a user and/or to identify a particular user. The thermal imaging device may be accompanied by thermal imaging software. The thermal imaging software may facilitate setup and/or calibration procedures similar to those previously described and may perform other functions known to those skilled in the art. The base heat signature can be associated with a user profile.

Another presence device that may be included in presence system 118 is a motion sensor. The motion sensor can be any type known to those skilled in the art.

The presence system 118 also may include a weight sensor. The weight sensor can be used to detect weight, for example, on furniture or on the floor. This can be used to detect presence of a user and/or the identity of the user. A base weight, for example, may be obtained during an initial measurement period in which the user is instructed to sit or stand on the weight sensor so that the weight sensor may obtain an accurate measurement. This measurement can be mapped to a user's profile. When the user sits or stands on the weight sensor on subsequent occasions the weight measurement is compared to the weight in the user profile. It is contemplated that a weight range may also be used so as to account for a user's fluctuating daily weight. In alternative embodiments, the weight sensor can be triggered by a threshold weight value. That is, an individual that weighs less than the threshold will not trigger the sensor. Conversely, an individual that weighs approximately equal to or more than the threshold will trigger the sensor. The weight sensor may be accompanied by software. The software may facilitate setup and/or calibration procedures (such as an initial measurement period).

Referring now to FIG. 2, a component view of the presence system 118 is illustrated. The illustrated TV/STB 122 includes a CPU 202; operatively linked to the CPU 202 is a memory 204 in which a database 206 is stored. The illustrated TV/STB 122 further includes a display 208 such as, but not limited to, a liquid crystal display (LCD), a plasma display, a Cathode Ray Tube (CRT) display, and the like; a modem 210 such as, but not limited to, a cable modem, a digital subscriber line (DSL) modem, a V.90 modem, and the like; and a source 212 such as, but not limited to, a television signal source provided by cable/satellite provider 130.

The presence devices 120 are shown in communication with various inputs via means for connection 124. The illustrated inputs are a port 214, a Bluetooth transceiver 216, and a WiFi transceiver 218. The port 214 can be a wireless transceiver (e.g., for communication with the RAN 106), a line-of-sight transceiver (e.g., IR and IrDA), and/or a direct connection (e.g., serial, USB, IEEE 1394 Firewire, Ethernet). The Bluetooth transceiver 216 is configured to send and receive information via short range radio frequency in accordance with the Bluetooth protocol standard, and the WiFi transceiver 218 is configured to send and receive information via radio frequency in accordance with IEEE 802.x protocol standards. It is contemplated that any of the above-mentioned inputs 214, 216, 218 can be integrated into the TV/STB 122 or can be provided as stand-alone units. The illustrated inputs 214, 216, 218 are operatively linked (within the TV/STB 122) to the CPU 202.

The CPU 202 is configured to process instructions set forth by each of the presence devices 120 and the associated software. The CPU 202 is further configured to analyze a user's preferences, presence, viewing behavior, and emotional responses in assigning an availability status to a user's MD.

The memory 204 can be any computer readable memory such as, but not limited to, Read-Only Memory (ROM), Random Access Memory (RAM), or a hybrid of ROM and RAM. The capacity of the memory 204 can be selected based upon the complexity and/or the number of user profiles and user profile content stored thereon. The database 206 can be, for example, an analytic database, an operational database, a hierarchical database, a network database, or any combination thereof. User profiles can be stored in the database and may be categorized by any categorization methods or algorithms known to those skilled in the art and applicable to such an application.

As briefly and previously described, a user profile can contain one or more identifying mechanisms in the form of base images, base scans, base heat signatures, weight profiles, and the like. In addition, a user profile can contain user preferences such as those for the TV component and STB component of the TV/STB 122. User preferences for mobile device (MD) to TV/STB 122 communication and presence device 120 to TV/STB 122 also may be set. For example, a user may elect only to use Bluetooth for communication between the user's MD and the TV/STB 122. By further example, the user may elect to use direct connection via USB for each of the presence devices 120, wherein the presence devices 120 may include multiple communication options. Alternatively or in addition, the user preferences can be extended to television programming preferences (favorites), sound preferences, video preferences, and MD communication preferences.

MD communication preferences define a user's preferences relative to a number of wireless communication scenarios. MD communication preferences can be set by the user through, for example, an interface on the user's MD or on the TV/STB 122. A number of MD communication preferences may be pre-set and a user may additionally add their own MD communication preferences and associated criteria. A user's MD communication preferences can be assigned an availability status. Some example availability statuses are described below.

Do Not Disturb can be the availability status used during live television shows and shows marked as such by a user. Do Not Disturb—Available in X Minutes can be the availability status used during a show or commercial, wherein X Minutes can be the number of minutes until the end of the current show or the number of minutes until a commercial. Unavailable can be the availability status used to indicate a user's MD is powered off. Unavailable in X Minutes can be the availability status used to indicate a show is starting in X Minutes or a commercial is ending in X Minutes, and that the user will not be available then. Available can be the availability status used to indicate that the user is available. Silent/Vibrate can be the availability status used to indicate the user is available and the user's MD is in a silent or vibrate mode. The abovementioned availability statuses are shown as textual descriptions of the availability status that may be, for example, displayed proximate to a contact in a contact list in PTT and/or IM applications. It should be understood, however, that the actual availability status of a user can include a bit string or character string distinguishable by the receiving device.

With regard to the Available/Unavailable in X minutes availability statuses, the number of minutes remaining until the user's availability status is changed can be determined at least in part by, for example, the indices that correspond to the beginning and end of a television show or commercial. In embodiments that include a DVD player or other video media player, it is contemplated that the number of minutes remaining can be determined at least in part by, for example, the indices that correspond to the various chapters included in a typical DVD movie. It is further contemplated that a timer may be implemented to allow for this feature.

The illustrated presence system 118 also includes MD A 104. MD A 104 is illustrated as being in communication with TV/STB 122 via means for connection 124. The illustrated MD A 104 includes a wireless transceiver 224, a WiFi transceiver 226, a Bluetooth transceiver 228, a port 230, a memory 222, and a user interface 232. All of which are operatively linked to a CPU 220.

The wireless transceiver 224 is configured to communicate with the RAN 106. The WiFi transceiver 226 is configured to send and receive information via radio frequency in accordance with IEEE 802.x protocol standards. The Bluetooth transceiver 228 is configured to send and receive information via short range radio frequency in accordance with the Bluetooth protocol standard and the port 230 can be, for example, a USB port, an IR port, an IrDA port, an IEEE 1394 Firewire port, an RJ-45 port, any combination thereof, and the like. The port 230 is configured to send and receive information in accordance with the corresponding standard.

The memory 222 can be any computer readable memory such as, but not limited to, Read-Only Memory (ROM), Random Access Memory (RAM), or a hybrid of ROM and RAM. The capacity of the memory 222 can be selected based upon the intended application. The memory can also be an internal and/or external memory and may be removable. The memory 222 may include a Subscriber Identity Module (SIM) that can store subscriber information such as subscription information, subscription status, telephone numbers, user preferences (which may include MD communication preferences), and the like.

The illustrated user interface 232 includes a display 234 (e.g., an LCD), a keypad 236 (e.g., a standard 12-key keypad), a speaker 238, and a microphone 240. It is contemplated that the user interface 232 can include other components known to those skilled in the art.

Figure 3:
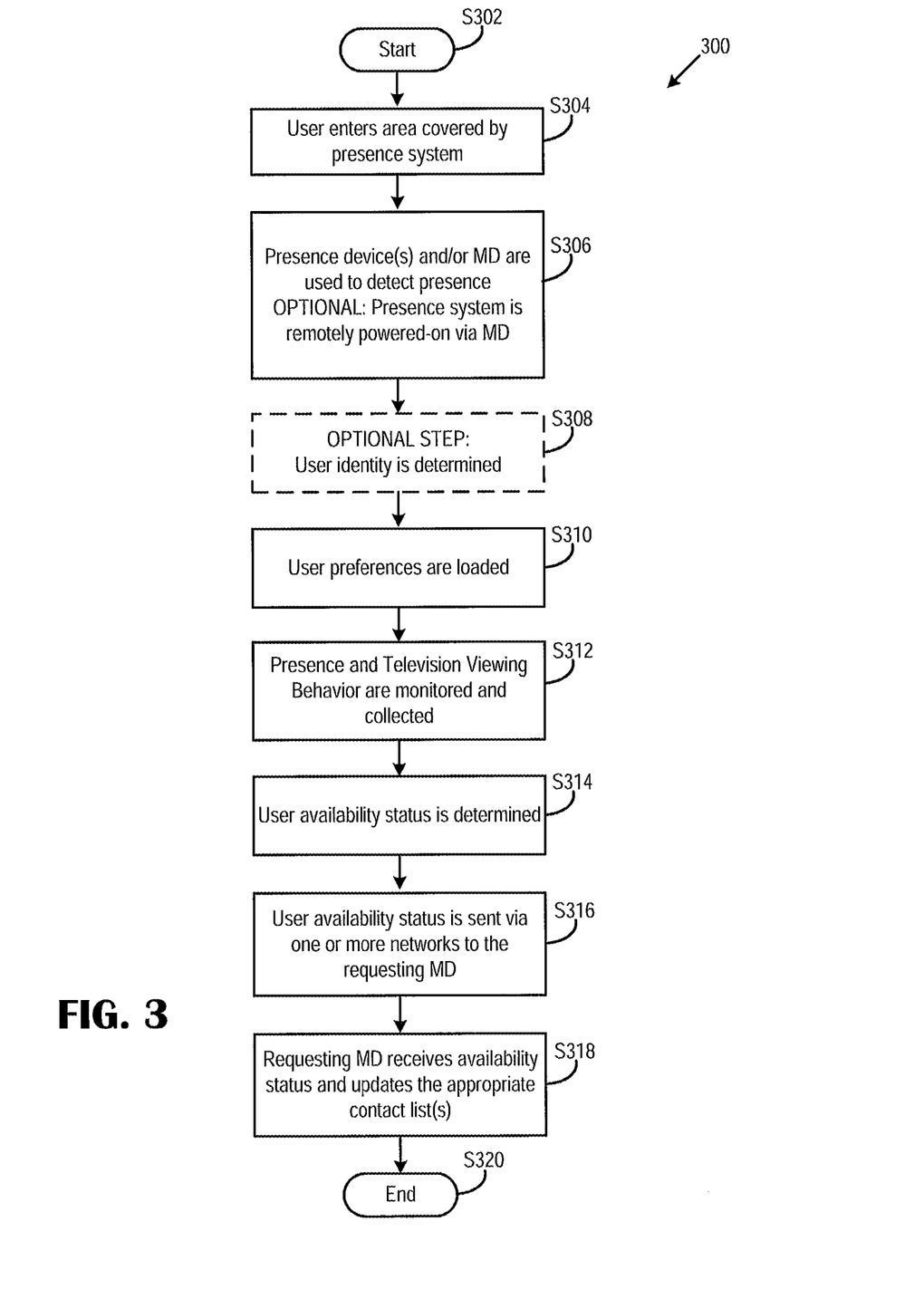
FIG. 3 illustrates a flow chart of an exemplary method for monitoring presence and television viewing behavior to update contact availability information, according to an exemplary embodiment of the present invention.

Referring now to FIG. 3, a flow chart of an exemplary method 300 for monitoring presence and television viewing behavior to update contact availability information is shown, according to the present invention. It should be understood that the steps described herein with reference to FIG. 3 are not limited to the order shown.

The illustrated method 300 begins at step S302 and proceeds to step S304, where a user (e.g., user A 102) enters an area monitored by the presence system 118. At step S306, the presence devices 120 and/or MD are used to detect presence. The MD may also be used to power-on the presence system 118 via any means for connection 124. At optional step S308, the identity of the user is determined utilizing any of the abovementioned means for determining presence. At step S310, the user's preferences are loaded. As previously described, user preferences may include television programming preferences (favorites), sound preferences, video preferences, MD communication preferences, and the like.

The description provided above has highlighted the presence aspects of the present invention. To further aid in determining and assigning an appropriate availability status for a user, the presence system 118 utilizes presence devices 120 to monitor and collect data with regard to a user's viewing behavior and their emotional state (S312). This data is combined with presence data and stored at least temporarily in memory 204. It is contemplated that algorithms may be utilized that are capable of categorizing a user's behavior and/or their emotional state based upon feedback obtained via the presence devices 120. These algorithms may, for example, utilize a user's body language, facial expressions, vocal responses, or any number of other metrics to determine an appropriate category. Further, this analysis can be performed in real-time, close to real-time, or in pre-determined intervals during which measurements are obtained and subsequently categorized.

The categories derived from these measurement and analysis procedures can be assigned to various availability statuses (S314). A portion of the contemplated availability statuses are described above, however, it should be understood and it bears repeating that additional availability statuses may be used. Moreover, the availability status can be dynamically updated in real-time or close to real-time. For example, if a user is watching a television show the availability status may be Do Not Disturb. Further, if a commercial is pending or the end of the show is approaching, the availability status may be changed to Do Not Disturb Available in X Minutes.

User preferences are also considered when assigning an availability status. For example, when a user leaves the room, presence is no longer detected and as such the presence system 118 may determine and assign a new availability status of Not Available for the user. It is contemplated, however, that a user preference may be available such that a user's availability is not updated for like situations or that another user-defined or pre-set availability status is used in place thereof. An example of this might be a preference that updates the availability status to Away when a user leaves the room. Another example might be a preference that does not update the availability status unless the user does not return in X number of minutes. It is contemplated that a variety of other preferences can be offered as selectable by a user or user-defined. Dynamic algorithms may be implemented to provide such features.

At step S316, the availability status is sent via one or more networks to the requesting MD (e.g., MD B 126). The requesting MD receives the availability status and updates the appropriate contact list(s) at step S318 and the method 300 ends at step S320.

Referring now to FIGS. 4*a*-4*d*, exemplary contact screens 400 for push to talk and instant message communication services are shown, according to the present invention. Each screen includes a soft button menu 402, which in the illustrated embodiments includes an Exit soft button and a Select soft button that function to exit the current screen and select the highlighted contact, respectively.

Figure 4A:
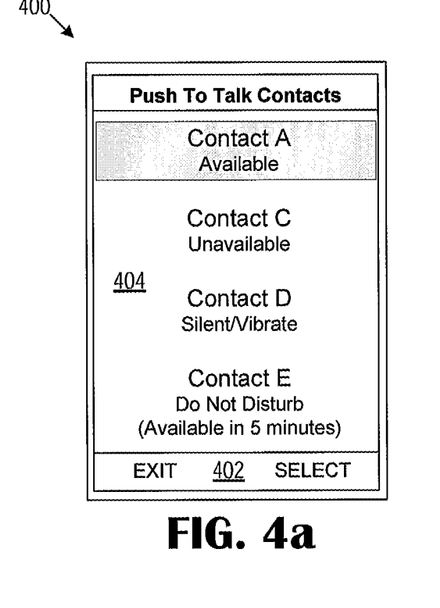
FIGS. 4a-4d illustrate exemplary contact screens for push to talk and instant message communication services, according to an exemplary embodiment of the present invention.

Referring specifically to FIG. 4*a*, a PTT contact list 404 is shown. The PTT contact list 404 is shown as a possible contact list on a requesting device, for example, MD B 128. The illustrated PTT contact list 404 includes Contact A (e.g., user A 102), Contact C, Contact D, and Contact E. Contact A has an availability status of Available, Contact C has an availability status of Unavailable, Contact D has an availability status of Silent/Vibrate, and Contact E has an availability status of Do Not Disturb—Available in 5 Minutes. The availability statuses of each of the contacts are updated in real-time, close to real-time, or during pre-determined intervals based upon at least one of user preferences, presence, what is being viewed, viewing behavior, and emotional responses of the monitored user.

Figure 4B:
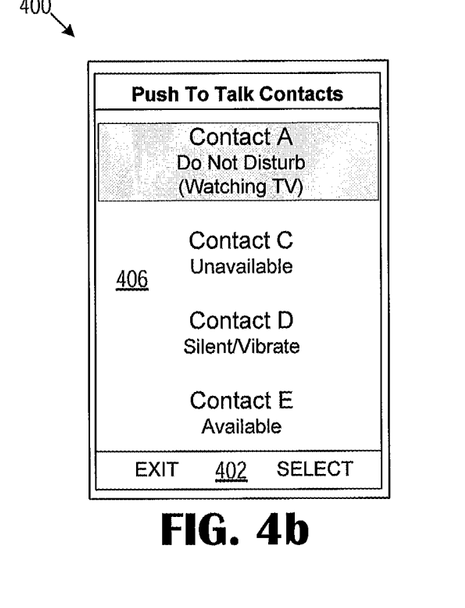

Referring specifically to FIG. 4*b*, a PTT contact list 406 is shown. The PTT contact list 406 includes the same contacts as PTT contact list 404; however, PTT contact list 406 depicts updated availability statuses for Contact A and Contact E. The availability status for Contact A is changed from Available to Do Not Disturb (Watching TV). The availability status for Contact E is changed from Do Not Disturb—Available in 5 Minutes to Available.

It is contemplated that the requesting user (e.g., user B 126) can receive a notification such as, but not limited to, a message, an audible tone, a flashing light emitting diode (LED), any combination thereof and the like, to indicate a change in one or more availability statuses. It is further contemplated that different notifications can be used for each contact. It is still further contemplated that the requesting user can modify the text associated with an availability status to reflect a custom text. In this case the availability status sent from the presence system 118 is unchanged. The associated text regardless of whether it is pre-set or user-defined, however, is changed.

Figure 4C:
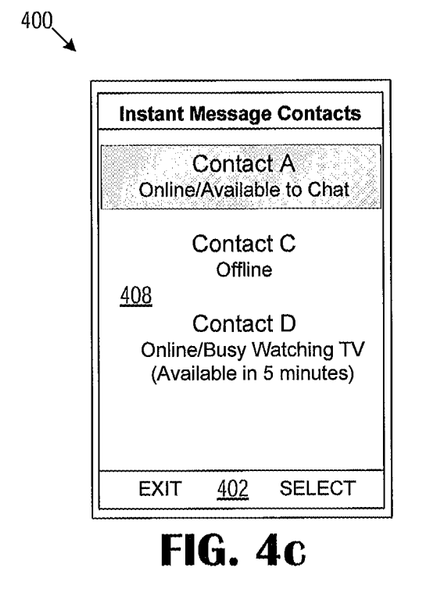

Referring specifically to FIG. 4*c*, an IM contact list 408 is shown. The IM contact list 408 is shown as a possible contact list on a requesting device, for example, MD B 128. The illustrated IM contact list 408 includes Contact A (e.g., user A 102), Contact C, and Contact D. Contact A has an availability status of Online/Available to Chat, Contact C has an availability status of Offline, and Contact D has an availability status of Online/Busy Watching TV—Available in 5 minutes. The availability statuses of each of the contacts are updated in real-time, close to real-time, or during pre-determined intervals based upon at least one of user preferences, presence, viewing behavior, and emotional responses of the monitored user.

Figure 4D:
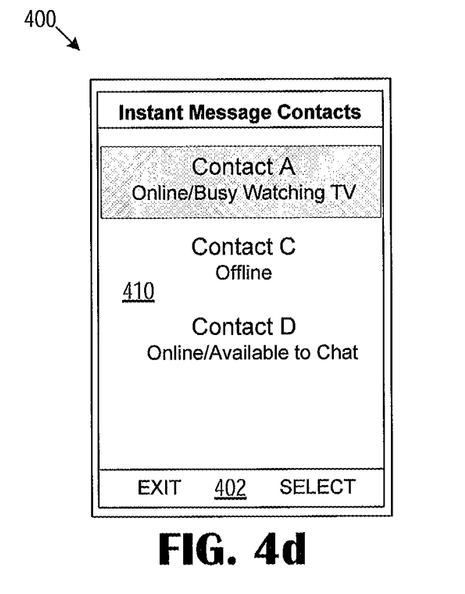

Referring specifically to FIG. 4*d*, an IM contact list 410 is shown. The IM contact list 410 includes the same contacts as IM contact list 408; however, IM contact list 410 depicts updated availability statuses for Contact A and Contact D. The availability status for Contact A is changed from Online/Available to Chat to Online/Busy Watching TV The availability status for Contact D is changed from Online/Busy Watching TV—Available in 5 minutes to Online/Available to Chat. The associated text displayed to reflect a user's availability can be dictated by the application as shown by the exemplary screens in FIGS. 4*a*-4*d*.

Figure 5:
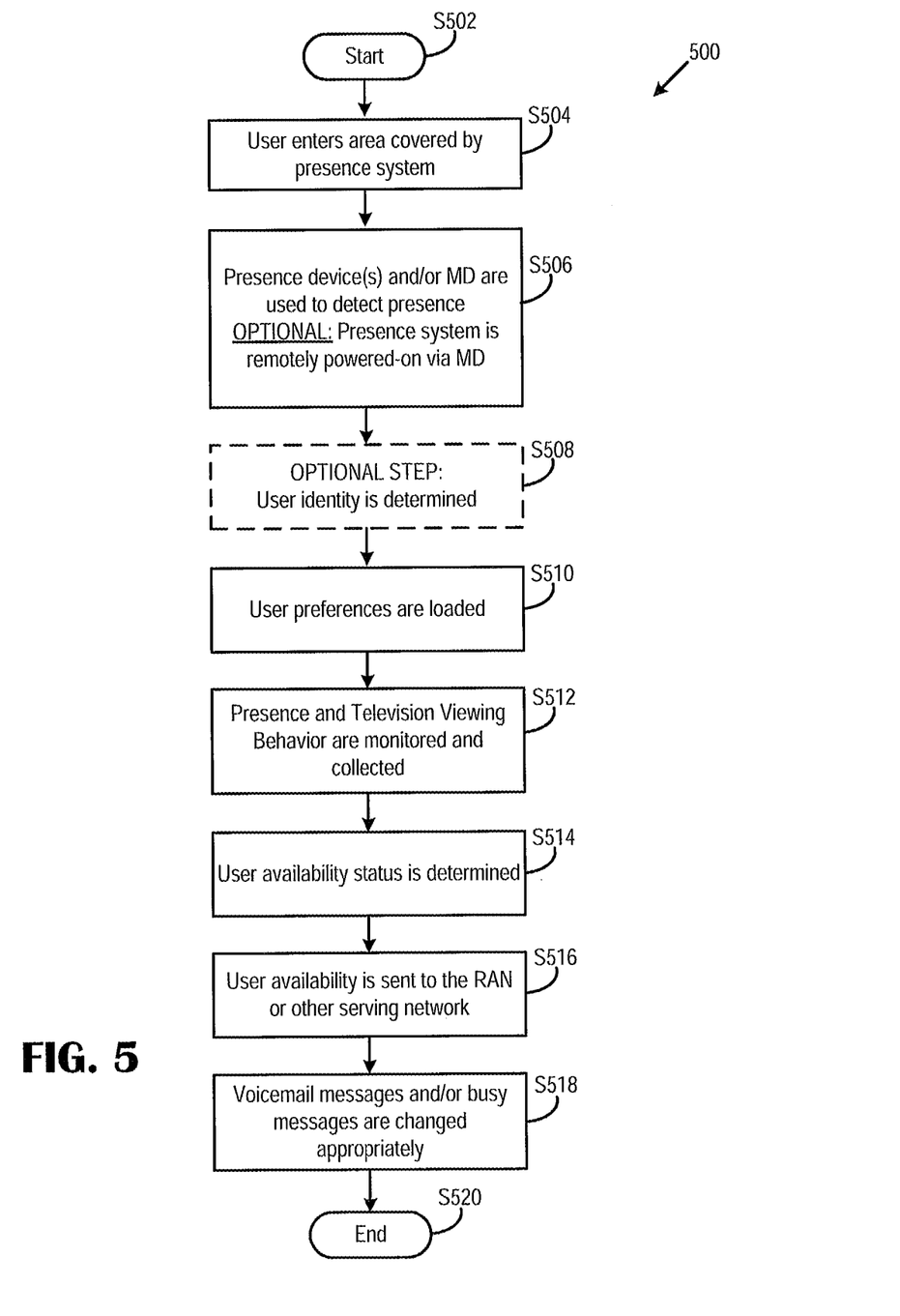
FIG. 5 illustrates a flow chart of an exemplary method for monitoring presence and television viewing behavior to update voicemail and busy messages, according to an exemplary embodiment of the present invention.

Referring now to FIG. 5, a flow chart of an exemplary method 500 for monitoring presence and television viewing behavior to update voicemail and busy messages according to the present invention is shown. It should be understood that the steps described herein with reference to FIG. 5 are not limited to the order shown.

The method 500 begins at step S502 and proceeds to step S504, where a user (e.g., user A 102) enters an area covered by the presence system 118. That is, the area in which the presence devices 120 are capable of monitoring and the communication range between a user's MD (e.g., MD A 104) and the TV/STB 122.

At step S506, the presence devices 120 and/or MD are used to detect presence. The MD may also be used to power-on the presence system 118 via any means for connection 124. At optional step S508, the identity of the user is determined utilizing any of the abovementioned means for determining presence. At step S510, the user's preferences are loaded.

To further aid in determining and assigning an appropriate availability status for a user, the presence system 118 utilizes presence devices 120 to monitor and collect data with regard to a user's viewing behavior and their emotional state (S512). This data is combined with presence data and stored at least temporarily in memory 204. It is contemplated that algorithms may be utilized that are capable of categorizing a user's behavior and/or their emotional state based upon feedback obtained via the presence devices 120 associated with the presence system 118. These algorithms may, for example, utilize a user's body language, their facial expressions, their vocal responses, or any number of other metrics to determine an appropriate category. Further, this analysis can be performed in real-time, close to real-time, or in pre-determined intervals during which measurements are obtained and subsequently categorized.

The categories derived from these measurements and analysis procedures can be assigned to various availability statuses (S514), similar to those assigned with regard to PTT or IM wireless applications. However, instead of the availability status being used to update the text associated with the availability of a contact in a contact list, the availability status is used to determine which of a number of voicemail messages and/or busy messages is to be used for a given availability status.

Present voicemail systems allow a user to record a voicemail message or use a generic one provided by the service provider. A voicemail message is played for a calling user when the called user is unavailable. Further, present voicemail systems also allow a user to record a busy message. The busy message is used to notify a calling user that the called user is currently engaged in another call. The present invention expands upon this concept by adding the ability to change the voicemail message and/or the busy message a calling user receives based upon the availability status.

As previously described with regard to the PTT and IM embodiments, the availability status in the form of text is updated to reflect a contact's new status. This text can be preset or user-defined. Similarly, the present embodiment allows a user to select from a number of preset voicemail messages or record their own message for each availability status. For example, if a user is busy watching television the voicemail message can reflect that and optionally can provide a time when that user will be available. Similar functionality can be provided for busy messages. It is contemplated that any number of voicemail and/or busy messages can be utilized.

At step S516, the availability status is sent to a voicemail server (not shown) on the RAN 106 or other serving network. The voicemail message or busy message for the user is then updated based upon the received availability status (S518). The method 500 ends at step S520.

The law does not require and it is economically prohibitive to illustrate and teach every possible embodiment of the present claims. Hence, the above-described embodiments are merely exemplary illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

The invention claimed is:

1. A system comprising:
a presence device;
a processor; and
a memory that stores computer-executable instructions that, when executed by the processor, cause the processor to perform operations comprising
obtaining, from a provider, a signal that corresponds to a media program,
detecting, using the presence device, a presence of a user in a proximity of the presence device, wherein the user is associated with a mobile communications device,
in response to detecting the presence of the user, accessing information that relates to the media program, wherein the information indicates a time associated with the media program, and wherein the information is obtained from the provider,
determining an availability status associated with the user, wherein the availability status is based on the presence and the information, wherein the availability status indicates an amount of time until the user is available, and
transmitting, to a device connected to a communications network, the availability status.

2. The system of claim 1, wherein the time associated with the media program comprises a time until an end of the media program.

3. The system of claim 1, wherein the time associated with the media program comprises a time until a commercial.

4. The system of claim 1, wherein the availability status further indicates if communications are accepted by the mobile communications device during the media program.

5. The system of claim 1, wherein the device connected to the communications network updates a status for the mobile communications device based on the availability status.

6. The system of claim 1, wherein the presence device comprises a facial recognition device comprising a camera, and wherein the presence of the user is determined by:
obtaining, using the camera, an image of the user; and
determining an emotional state of the user based on the image.

7. The system of claim 6, wherein the image is used to determine a facial expression, and wherein the emotional state is determined based on the facial expression.

8. A method comprising:
obtaining, by a device comprising a presence device, a memory, and a processor, a signal from a provider, wherein the signal corresponds to a media program;
detecting, by the presence device, a presence of a user in a proximity of the presence device, wherein the user is associated with a mobile communications device;
in response to detecting the presence of the user, accessing, by the device, information that relates to the media program, wherein the information indicates a time associated with the media program, and wherein the information is obtained from the provider;
determining, by the device, an availability status associated with the user, wherein the availability status is based on the presence and the information, wherein the availability status indicates an amount of time until the user is available; and
transmitting, by the device and to a further device that is connected to a communications network, the availability status.

9. The method of claim 8, wherein the time associated with the media program comprises a time until an end of the media program.

10. The method of claim 8, wherein the time associated with the media program comprises a time until a commercial.

11. The method of claim 8, wherein the availability status further indicates if communications are accepted by the mobile communications device during the media program.

12. The method of claim 8, wherein the further device updates a status for the mobile communications device based on the availability status.

13. The method of claim 8, wherein the presence device comprises a facial recognition device comprising a camera, and wherein the presence of the user is determined by:
obtaining, using the camera, an image of the user; and
determining an emotional state of the user based on the image.

14. The method of claim 13, wherein the image is used to determine a facial expression, and wherein the emotional state is determined based on the facial expression.

15. A device comprising:
a presence device;
a processor; and
a memory storing computer-executable instructions that, when executed by the processor, cause the processor to perform operations comprising
obtaining, from a provider, a signal that corresponds to a media program,
detecting, using the presence device, a presence of a user in a proximity of the presence device, wherein the user is associated with a mobile communications device,
in response to detecting the presence of the user, accessing information that relates to the media program, wherein the information indicates a time associated with the media program, and wherein the information is obtained from the provider,
determining an availability status associated with the user, wherein the availability status is based on the presence and the information, wherein the availability status indicates an amount of time until the user is available, and transmitting, to a further device that is connected to a communications network, the availability status.

16. The device of claim 15, wherein the time associated with the media program comprises a time until an end of the media program.

17. The device of claim 15, wherein the time associated with the media program comprises a time until a commercial.

18. The device of claim 15, wherein the availability status further indicates if communications are accepted by the mobile communications device during the media program.

19. The device of claim 15, wherein the further device comprises updates a status for the mobile communications device based on the availability status.

20. The device of claim 15, wherein the presence device comprises a facial recognition device comprising a camera, and wherein the presence of the user is determined by:
   obtaining, using the camera, an image of the user; and
   determining an emotional state of the user based on the image.

* * * * *